United States Patent
Dong et al.

(10) Patent No.: US 8,882,363 B2
(45) Date of Patent: Nov. 11, 2014

(54) OPTICAL FIBER CONNECTOR, OPTICAL FIBER ADAPTER, AND WATERPROOF OPTICAL FIBER ASSEMBLY USING THE SAME

(71) Applicants: Min Dong, Shenzhen (CN); Jun-Jin Pan, Shenzhen (CN); Leland Wang, Santa Clara, CA (US)

(72) Inventors: Min Dong, Shenzhen (CN); Jun-Jin Pan, Shenzhen (CN); Leland Wang, Santa Clara, CA (US)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 98 days.

(21) Appl. No.: 13/676,325

(22) Filed: Nov. 14, 2012

(65) Prior Publication Data
US 2013/0129285 A1 May 23, 2013

(30) Foreign Application Priority Data
Nov. 21, 2011 (CN) .......................... 2011 1 0370598

(51) Int. Cl.
G02B 6/36 (2006.01)
G02B 6/38 (2006.01)

(52) U.S. Cl.
CPC ................ G02B 6/36 (2013.01); G02B 6/3825 (2013.01); G02B 6/3816 (2013.01); G02B 6/3869 (2013.01)

USPC .................................. 385/77; 385/88; 385/94

(58) Field of Classification Search
USPC ..................... 385/76–78, 81, 88, 94
See application file for complete search history.

(56) References Cited

U.S. PATENT DOCUMENTS

| | | | |
|---|---|---|---|
| 6,652,157 B2 * | 11/2003 | Schmidt et al. ................. | 385/88 |
| 6,749,344 B2 * | 6/2004 | Hamm et al. .................... | 385/72 |
| 8,388,235 B1 * | 3/2013 | Volker et al. ..................... | 385/59 |
| 8,480,312 B2 * | 7/2013 | Smith et al. ..................... | 385/86 |
| 8,628,252 B2 * | 1/2014 | Matsumoto et al. ............ | 385/56 |
| 2008/0298753 A1 * | 12/2008 | Maletzky et al. ............... | 385/94 |

* cited by examiner

*Primary Examiner* — Ryan Lepisto
*Assistant Examiner* — Robert Tavlykaev
(74) *Attorney, Agent, or Firm* — Novak Druce Connolly Bove + Quigg LLP

(57) ABSTRACT

An optical fiber assembly includes an optical fiber connector, and an optical fiber adapter mating with the optical fiber connector. The optical fiber connector includes a fiber joining assembly, a first sealing member, an elastic member, and a housing assembly sleeved on the fiber joining assembly. The elastic member is slidably sleeved in the housing assembly with two ends of the elastic member resisting with the housing assembly. The optical fiber adapter includes a base board, a fixing seat protruding out from the base board, and a second sealing member sleeved on the outer surface of the fixing seat. The optical fiber adapter further includes two latching arms protruding out from the base board positioned at opposite sides of the fixing seat. The fixing seat axially defines an assembling groove for receiving the fiber joining assembly of the optical fiber connector.

20 Claims, 8 Drawing Sheets

OPTICAL FIBER CONNECTOR, OPTICAL FIBER ADAPTER, AND WATERPROOF OPTICAL FIBER ASSEMBLY USING THE SAME

BACKGROUND

1. Technical Field

The present disclosure generally relates to an optical fiber assembly, and particularly to an optical fiber connector, an optical fiber adapter, and a waterproof optical fiber assembly using the optical fiber connector and the optical fiber adapter.

2. Description of the Related Art

As the fiber to the home (FTTH) becomes more widely used in the communication field, many waterproof optical fiber assemblies are needed for connecting optical fibers in outdoor environment where dust, moisture/humidity or other contaminants can degrade the overall performance and/or damage of the optical fiber assembly. A typical waterproof optical fiber assembly includes an optical fiber connector and an optical fiber adapter mating with the optical fiber connector. The optical fiber connector includes a fiber joining assembly and an outer housing sleeved on the fiber joining assembly. When the optical fiber connector is assembled to the optical fiber adapter, the fiber joining assembly is firstly assembled to the optical fiber adapter, and then, the outer housing is assembled to the optical fiber adapter to cover the fiber joining assembly for preventing the optical fiber assembly from dust, moisture/humidity or other contaminants. When the optical fiber connector needs to be disassembled from the optical fiber adapter, an operator needs to disassemble the outer housing and the fiber joining assembly in proper order. However, it is inconvenient for the operator to assembly or disassembly the optical fiber assembly.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
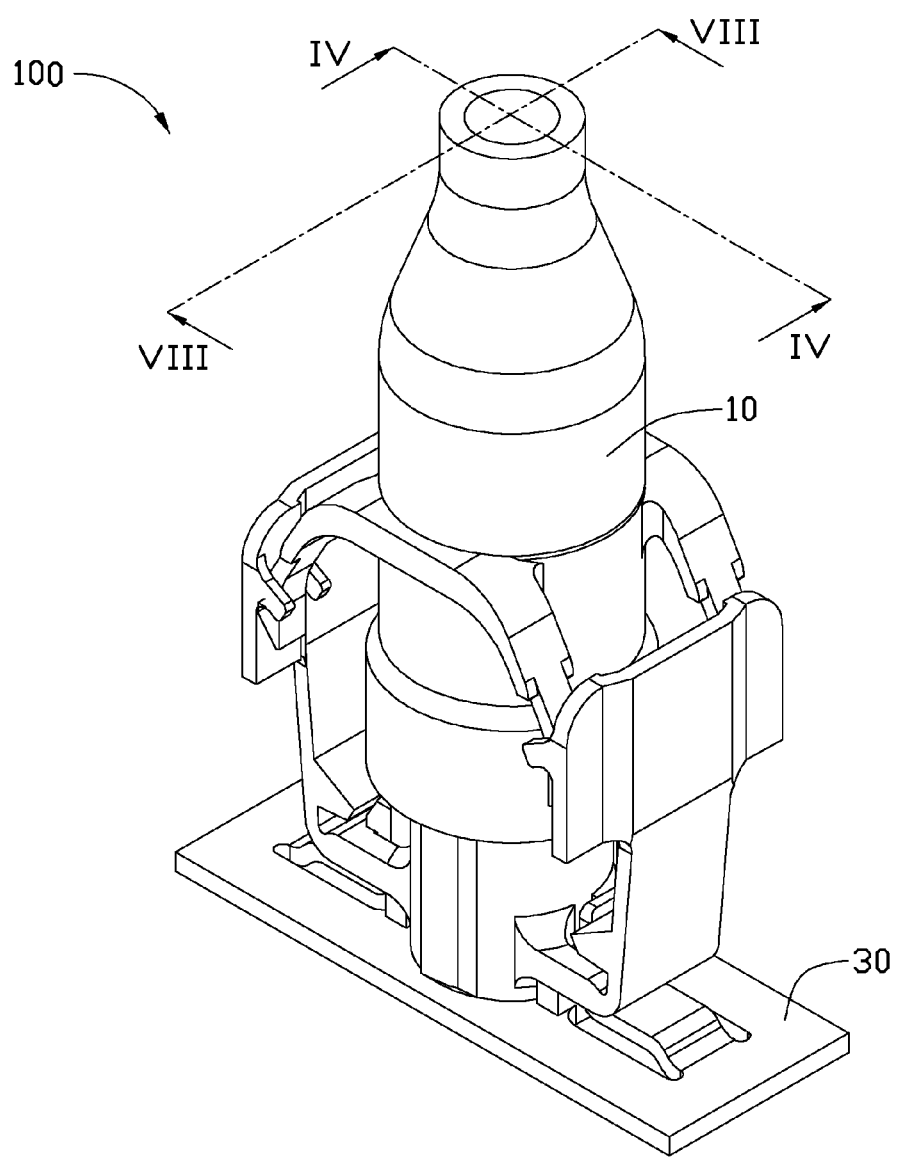
FIG. 1 is an isometric, assembled view of an embodiment of an optical fiber assembly.

FIG. 1 shows an embodiment of an optical fiber assembly 100. The optical fiber assembly 100 includes an optical fiber connector 10 and an optical fiber adapter 30 mating with the optical fiber connector 10.

Figure 2:
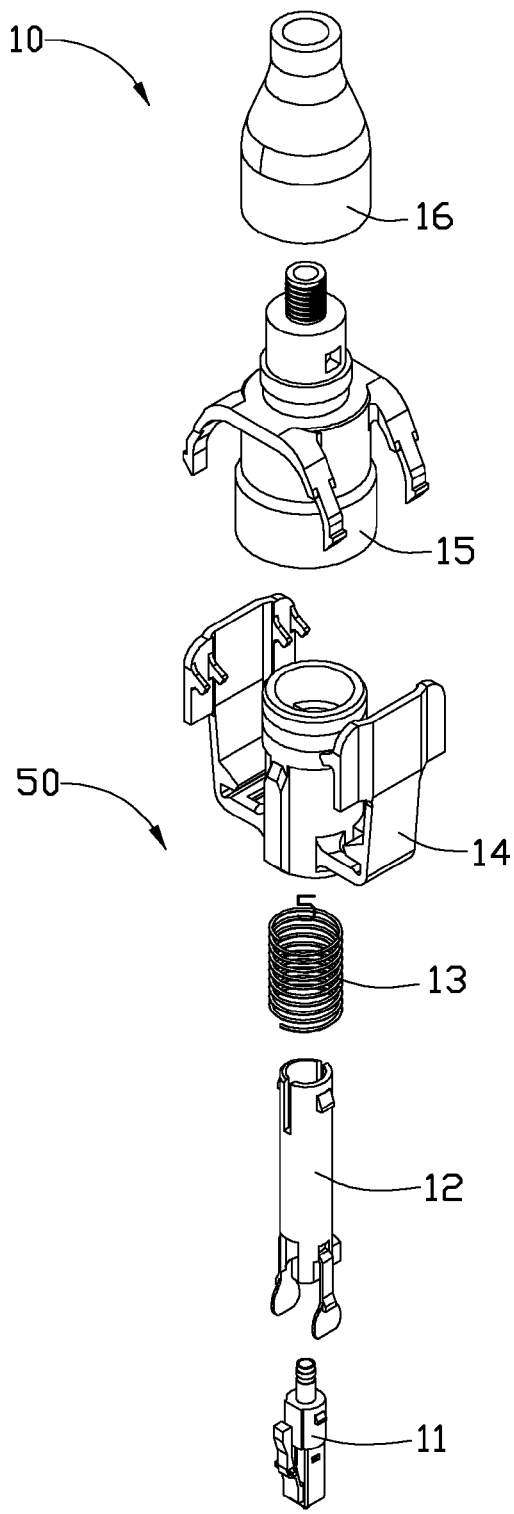
FIG. 2 is an exploded, isometric view of the optical fiber connector of the optical fiber assembly of FIG. 1.
Figure 3:
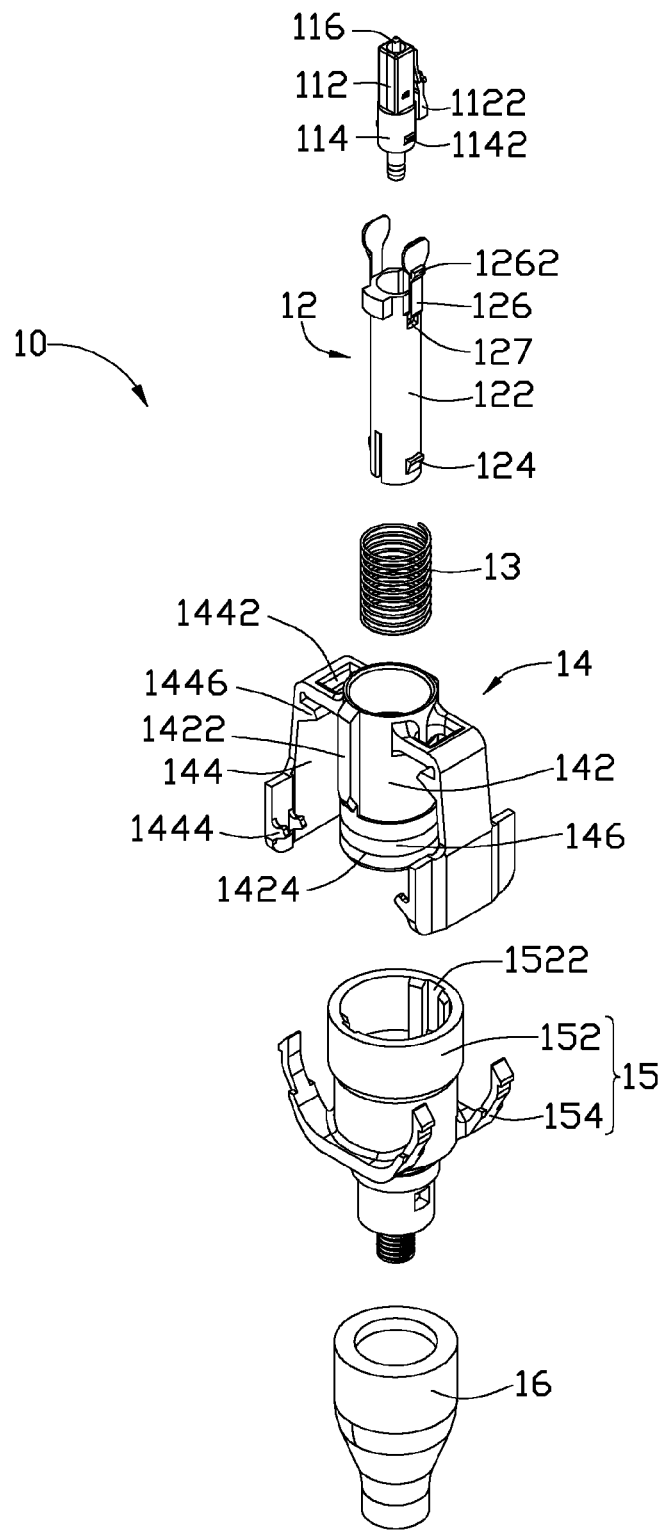
FIG. 3 is similar to FIG. 2, but viewed from another aspect.

FIGS. 2 and 3 show an embodiment of the optical fiber connector 10. The optical fiber connector 10 includes a fiber joining assembly 11, a first housing 12, an elastic member 13, a second housing 14, a third housing 15, and a fourth housing 16. The first housing 12, the second housing 14, the third housing 15, and the fourth housing 16 cooperatively form a housing assembly 50 sleeved on the fiber joining assembly 11. The fiber joining assembly 11 is sleeved in an end of the first housing 12. The elastic member 13 is a spring, and is slidably sleeved on the first housing 12. The second housing 14 is sleeved on one end of the first housing 12 adjacent to the fiber joining assembly 11. The third housing 15 is sleeved on the other end of the first housing 12. The fourth housing 16 is sleeved on an end of the third housing 15 away from the second housing 14. One end of the elastic member 13 resists with the second housing 14, and the other end of the elastic member 13 resists with the third housing 15.

In the illustrated embodiment, the fiber joining assembly 11 is an LC optical fiber connector. It is apparent that the fiber joining assembly 11 can be selected from a FC, SC and other optical fiber connectors. The fiber joining assembly 11 includes a main housing 112, a boot 114 sleeved on an end of the main housing 112, a ferrule 116 received in an end of the main housing 112 away from the boot 114. The main housing 112 forms a latching arm 1122 at an outer surface of the main housing 112 away from the boot 114 for securing the main housing 112 to the optical fiber adapter 30. The boot 114 forms two latching protrusions 1142 at opposite sides of the outer surface of the boot 114 for securing the boot 114 to the first housing 12.

The first housing 12 can be cylindrical, and includes a main portion 122, two latching projections 124, and two elastic arms 126. The two latching projections 124 are formed at opposite sides of the outer surface of the main portion 122 adjacent to an end of the main portion 122. The two elastic arms 126 are extended from an end of the main portion 122 away from the two latching projections 124, and oppositely disposed to each other. The first housing 12 further defines two latching grooves 127 in the main portion 122 adjacent to the two elastic arms 126 corresponding to the two latching protrusions 1142 of the boot 114. Each of the two elastic arms 126 forms a latching protrusion 1262 at about the middle portion thereof. When the fiber joining assembly 11 is sleeved in the first housing 12, each of the two latching protrusions 1142 is latched in the corresponding latching groove 127 to fix the fiber joining assembly 11 in the first housing 12.

Figure 4:
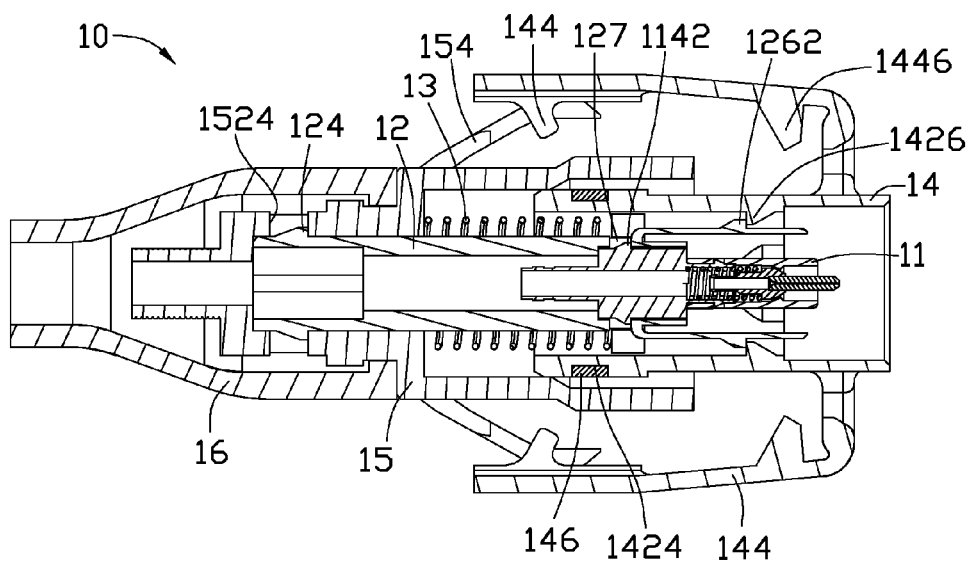
FIG. 4 is a cross-sectional view of the optical fiber connector of the optical fiber assembly of FIG. 1 taken along the line IV-IV.
Figure 8:
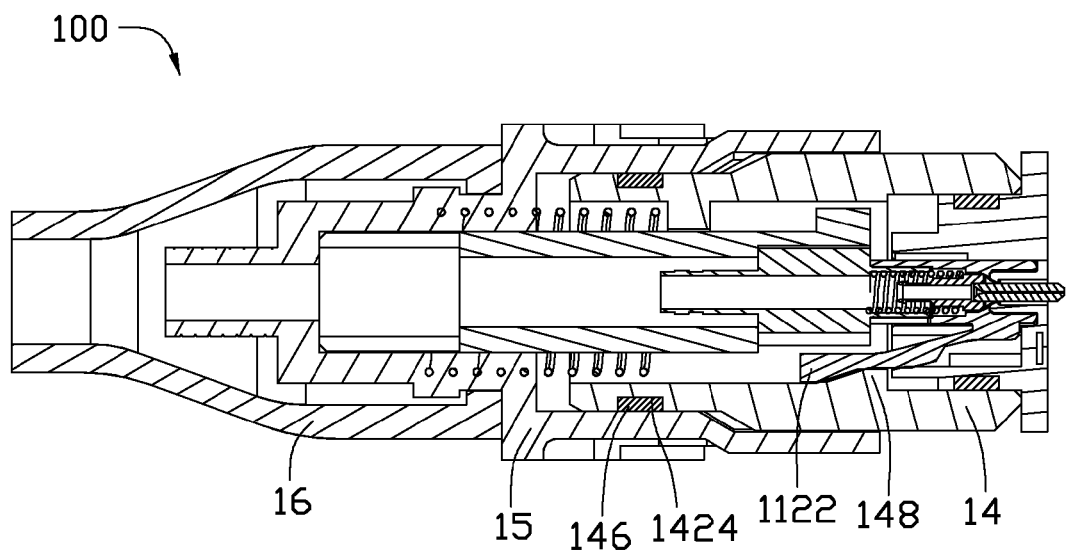
FIG. 8 is a cross-sectional view of the optical fiber assembly of FIG. 1 taken along the line VIII-VIII, showing the optical fiber connector being disassembled from the optical fiber adapter.

The second housing 14 includes a base portion 142, two elastic latching arms 144 extending from the outer surface of the base portion 142 adjacent to an end of the base portion 142, and a first sealing member 146 sleeved on the base portion 142 away from the two elastic latching arms 144. The two elastic latching arms 144 are positioned at opposite sides of the base portion 142. The base portion 142 forms two restricting flanges 1422 protruding out from opposite sides of the base portion 142 along a direction parallel to the longitudinal axis of the base portion 142. The base portion 142 defines an annular groove 1424 at the outer surface of the base portion 142 away from the two elastic latching arms 144 for receiving the first sealing member 146. Each of the two elastic latching arms 144 defines a latching hole 1442 in an end of each of the two elastic latching arms 144 adjacent to the base portion 142. Each of the two elastic latching arms 144 forms a pair of latching portions 1444 at the inner surface of each of the two elastic latching arms 144 adjacent to the third housing 15. Each of the two elastic latching arms 144 further forms an unlocking portion 1446 at the inner surface of each of the two elastic latching arms 144 away from the third housing 15. The base portion 142 further forms two latching portions 1426 (as shown in FIG. 4) at the inner surface of the base portion 142 adjacent to the two elastic latching arms 144 corresponding to the two latching protrusion 1262. The main portions 142 further forms a stopping portion 148 at the inner surface of the base portion 142 between the two latching portions 1426 corresponding to the latching arm 1122 of the fiber joining assembly 11 (as shown in FIG. 8).

The third housing 15 includes a main portion 152, two pairs of latching arms 154 extending from the outer surface of the main portion 152. The main portion 152 can be substantially funneled. The main portion 152 defines two restricting grooves 1522 at the inner surface of the main portion 152 adjacent to a larger opening of the main portion 152 corresponding to the two restricting flanges 1422 of the second housing 14. The main portion 152 further defines two latching grooves 1524 in the other end of the main portion 152 corresponding to the two latching projections 124 of the first housing 12.

The fourth housing 16 is sleeved on a distal end of the third housing 15 adjacent to the two latching grooves 1524. In the illustrated embodiment, the fourth housing 16 is fastened to the third housing 15 via latching structures (not labeled).

Referring to FIG. 4, in assembly of the optical fiber connector 10, the fiber joining assembly 11 is fastened in the first housing 12 with the two latching protrusions 1142 latching in the two latching grooves 127, respectively. The elastic member 13 is slidably sleeved on the first housing 12. The second housing 14 is sleeved on an end of the first housing 12 adjacent to the two elastic arms 126, with the two latching portions 1426 latching with the two latching protrusion 1262 of the two elastic arms 126, respectively. The third housing 15 is sleeved on an end of the first housing 12 adjacent to the two latching projections 124, with the two latching projections 124 latching in the two latching grooves 1524, respectively. At this time, the second housing 14 is partly received in the third housing 15, with each of the two restricting flanges 1422 latching in one corresponding restricting groove 1522 and each pair of the two pairs of latching arms 154 latching with one corresponding pair of latching portions 1444.

As the two latching portions 1426 are respectively latched with the two latching protrusions 1262, axial movement of the second housing 14 towards the third housing 15 can thereby be prevented. When the optical fiber connector 10 is been dropped, bumped around, or collided by another object, the second housing 14 will not compress the elastic member 13, and will prevent the ferrule 116 from being damaged.

The fourth housing 16 is used for facilitating an operator to operate the optical fiber connector 10. In an alternative embodiment, the fourth housing 16 can be omitted.

Figure 5:
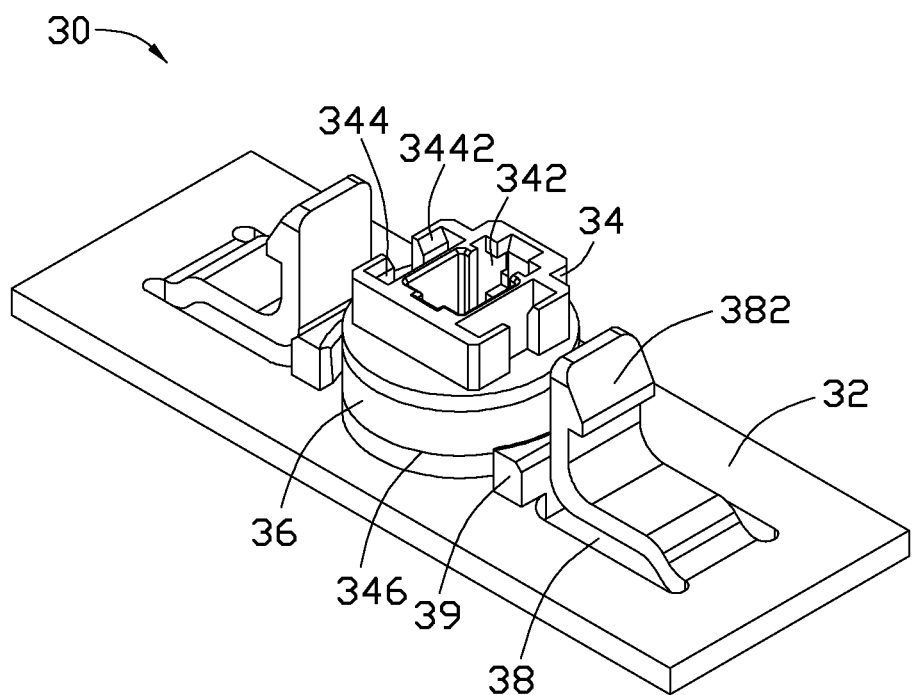
FIG. 5 is an isometric, assembled view of the optical fiber adapter of the optical fiber assembly of FIG. 1.

FIG. 5 shows an embodiment of the optical fiber adapter 30. The optical fiber adapter 30 includes a base board 32, a fixing seat 34 protruding out from about the middle portion of the base board 32, and a second sealing member 36 sleeved on the outer surface of the fixing seat 34.

The base board 32 can be a rectangular board. The base board 32 defines two through holes 38 in opposite sides of the fixing seat 34 and forms two latching arms 382 positioned at opposite sides of the fixing seat 34. In the illustrated embodiment, each of the two through holes 38 is a rectangular through hole, each of the two latching arms 382 extends from an inner side wall of one through hole 38 away from the base board 32 towards the fixing seat 34. The fixing seat 34 can be a cylinder, and axially defines an assembling groove 342 in an end of the fixing seat 34 away from the base board 32 for receiving the fiber joining assembly 11. The fixing seat 34 further axially defines two receiving grooves 344 at opposite sides of the assembling groove 342 for receiving the two elastic arms 126, respectively. The inner surface of one sidewall of each of the two receiving grooves 344 forms a chamfer 3442 at a top portion thereof for facilitating the insertion of each of the two elastic arms 126. The fixing seat 34 further defines an annular groove 346 in the outer surface of an end of the fixing seat 34 adjacent to the base board 32 for receiving the second sealing member 36. The optical fiber adapter 30 further includes two resisting portions 39 positioned between the two latching arms 382 and the fixing seat 34 for resisting the second housing 14 of the optical fiber connector 10, which can increase the resisting force between the second housing 14 and the second sealing member 36.

In alternative embodiments, it is apparent that at least one of the two resisting portions 39 can be omitted, and the shape of each of the two through holes 38 can be circular, or others.

Figure 6:
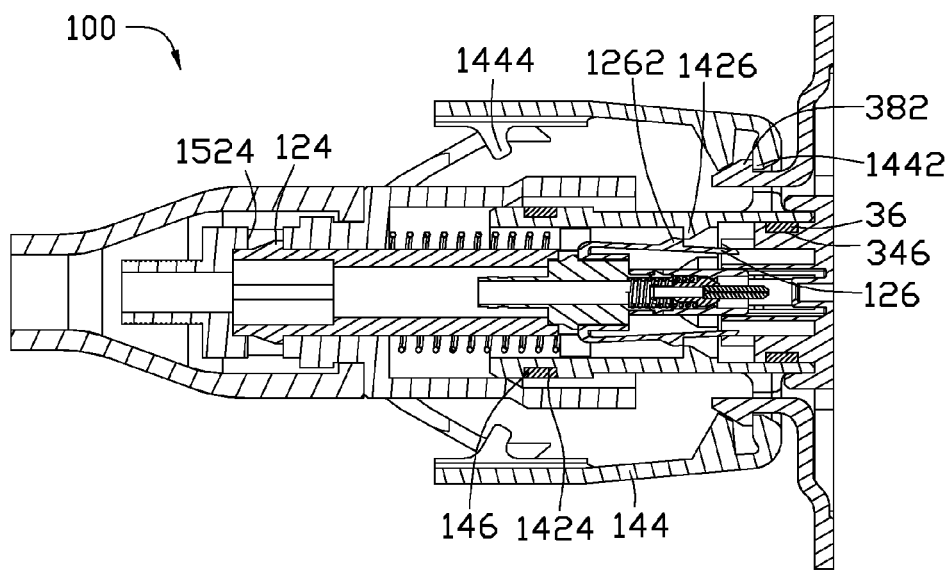
FIG. 6 is a cross-sectional view of the optical fiber assembly of FIG. 1 taken along the line IV-IV, showing the optical fiber connector being assembled into the optical fiber adapter.
Figure 7:
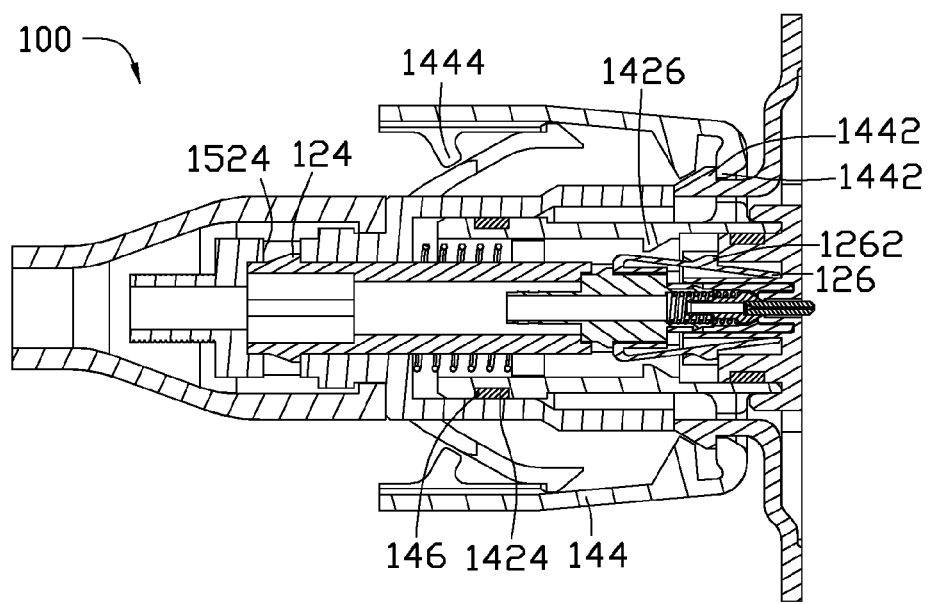
FIG. 7 is a cross-sectional view of the optical fiber assembly of FIG. 1 taken along the line IV-IV.

FIGS. 6 and 7 shows the optical fiber connector 10 being assembled to the optical fiber adapter 30 along a direction parallel to the optical axis of the optical fiber connector 10. The two latching arms 382 are latched in the two latching holes 1442, respectively. The second sealing member 36 is positioned between the second housing 14 and the fixing seat 34 with the inner surface of the second housing 14 resisting with the outer surface of the fixing seat 34 and the outer surface of the second housing 14 resisting with the two resisting portions 39. Thus, water, or other liquid solutions are prevented from flowing into the inner void or empty space of the optical fiber assembly 100. Each of the two elastic arms 126 is slidably inserted into one corresponding receiving grooves 344 along one corresponding chamfer 3442. Due to the resisting by the chamfers 3442, the two elastic arms 126 bend towards the fiber joining assembly 11 to unlock the two latching protrusions 1262 of the two elastic arms 126 and the two latching portions 1426 of the second housing 14. In addition, the optical fiber connector 10 is pushed toward the optical fiber adapter 30 until the fiber joining assembly 11 is latched in the assembling groove 342. At this time, the third housing 15 slides towards the second housing 14 with the inner surface of the third housing 15 resisting with the first sealing member 146 sleeved on the second housing 14. Thus, water, or other liquid solutions are prevented from flowing into the inner void or empty space of the fiber joining assembly 11 from a slot formed between the second housing 14 and the third housing 15.

FIGS. 7 and 8 show that when the optical fiber connector 10 needs to be disassembled from the optical fiber adapter 30, the two elastic latching arms 144 of the second housing 14 are pressed, and the unlocking portions 1446 will then press the two latching arms 382 to unlock the two latching arms 382 and the two elastic latching arms 144. The second housing 14 is pulled along a direction away from the optical fiber adapter 30. The stopping portion 148 will press the latching arm 1122 to unlock the fiber joining assembly 11 and the optical fiber adapter 30. The second housing 14 is returned to its original state (as shown in FIG. 4) with the help of the compressed elastic member 13. It is apparent that the optical fiber assembly 100 is easy to assembly or disassembly.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. An optical fiber assembly, comprising:
an optical fiber connector, the optical fiber connector comprising a fiber joining assembly, a first sealing member, an elastic member, and a housing assembly sleeved on the fiber joining assembly, the housing assembly comprising a first housing, a second housing, and a third housing, wherein the fiber joining assembly is sleeved in an end of the first housing, the second housing is sleeved on one end of the first housing adjacent to the fiber joining assembly, the third housing is sleeved on the other end of the first housing, and the second housing is partly received in the third housing, the elastic member is slidably sleeved on the first housing and provides resistance between the second housing and the third housing, and the first sealing member is sleeved on the second housing adjacent to the third housing; and
an optical fiber adapter mating with the optical fiber connector, the optical fiber adapter comprising a base board, a fixing seat protruding out from the base board, and a second sealing member sleeved on the outer surface of the fixing seat,
wherein the second housing comprises a base portion and two elastic latching arms protruding out from an end of the base portion adjacent to the fiber joining assembly, each of the two first elastic arms defines a latching hole in an end of each of the two elastic latching arms adjacent to the base portion, the optical fiber adapter further comprises two latching arms protruding out from the base board positioned at opposite sides of the fixing seat for latching with the two latching holes of the second housing and, the fixing seat axially defines an assembling groove for receiving the fiber joining assembly, and the second sealing member provides resistance to an inner surface of the second housing.

2. The optical fiber assembly of claim 1, wherein the base portion defines an annular groove at an outer surface of the base portion away from the two elastic latching arms, and the first sealing member is received in the annular groove.

3. The optical fiber assembly of claim 1, wherein the two elastic latching arms are positioned at opposite sides of the base portion.

4. The optical fiber assembly of claim 1, wherein the base portion forms two restricting flanges protruding out from opposite sides of the base portion along a direction parallel to a longitudinal axis of the base portion, the third housing defines two restricting grooves at the inner surface thereof for receiving the corresponding restricting flanges.

5. The optical fiber assembly of claim 1, wherein each of the two elastic latching arms forms a pair of latching portions at an inner surface of each of the two elastic latching arms adjacent to the third housing, and the third housing forms two pairs of second latching arms extending from an outer surface of the third housing for latching with the two pairs of latching portions.

6. The optical fiber assembly of claim 1, wherein the first housing comprises a main portion and two elastic arms extending from an end of the main portion, each of the two elastic arms forms a latching protrusion, and the second housing forms two latching portions at an inner surface of the base portion for latching with the two latching protrusions of the elastic arms.

7. The optical fiber assembly of claim 2, wherein the first housing further comprises two latching projections at opposite sides of the outer surface of the main portion away from the two elastic arms, the third housing defines two latching grooves for latching with the two latching projections.

8. The optical fiber assembly of claim 7, wherein the housing assembly of the optical fiber connector further comprises a fourth housing sleeved on a distal end of the third housing adjacent to the two latching grooves.

9. The optical fiber assembly of claim 1, wherein the fixing seat further defines an annular groove in an outer surface of the fixing seat adjacent to the base board for receiving the second sealing member.

10. An optical fiber connector for fixing an optical fiber comprising:
a fiber joining assembly;
a first sealing member;
an elastic member; and
and a housing assembly sleeved on the fiber joining assembly, the housing assembly comprising a first housing, a second housing, and a third housing, wherein the fiber joining assembly is sleeved in an end of the first housing, the second housing is sleeved on one end of the first housing adjacent to the fiber joining assembly, the third housing is sleeved on the other end of the first housing, and the second housing is partly received in the third housing, the elastic member is slidably sleeved on the first housing and provides resistance between the second housing and the third housing, the first sealing member is sleeved on the second housing adjacent to the third housing, the second housing comprises a base portion and two elastic latching arms protruding out from an end of the base portion adjacent to the fiber joining assembly, each of the two first elastic arms defines a latching hole in an end of each of the two elastic latching arms adjacent to the base portion.

11. The optical fiber connector of claim 10, wherein the base portion defines an annular groove at an outer surface of the base portion away from the two elastic latching arms, and the first sealing member is received in the annular groove.

12. The optical fiber connector of claim 10, wherein the two elastic latching arms are positioned at opposite sides of the base portion.

13. The optical fiber connector of claim 10, wherein the base portion forms two restricting flanges protruding out from opposite sides of the base portion along a direction parallel to a longitudinal axis of the base portion, the third housing defines two restricting grooves at the inner surface thereof for receiving the corresponding restricting flanges.

14. The optical fiber connector of claim 10, wherein each of the two elastic latching arms forms a pair of latching portions at an inner surface of each of the two elastic latching arms adjacent to the third housing, the third housing forms two pairs of second latching arms extending from an outer surface of the third housing for latching with the two pairs of latching portions.

15. The optical fiber connector of claim 10, wherein the first housing comprises a main portion and two elastic arms extending from an end of the main portion, each of the two elastic arms forms a latching protrusion, and the second housing forms two latching portions for latching at an inner surface of the base portion with the two latching protrusions of the elastic arms.

16. The optical fiber connector of claim 11, wherein the first housing further comprises two latching projections at opposite sides of the outer surface of the main portion away from the two elastic arms, and the third housing defines two latching grooves for latching with the two latching projections.

17. The optical fiber connector of claim 16, wherein the housing assembly of the optical fiber connector further comprises a fourth housing sleeved on a distal end of the third housing adjacent to the two latching grooves.

18. An optical fiber adapter for mating with an optical fiber connector, the optical fiber connector comprising a fiber joining assembly and a housing assembly sleeved on the fiber joining assembly, the optical fiber adapter comprising:
   a base board;
   a fixing seat protruding out from the base board;
   a second sealing member sleeved on an outer surface of the fixing seat, wherein the fixing seat axially defines an assembling groove for receiving the fiber joining assembly, the optical fiber adapter further comprises two latching arms protruding out from the base board positioned at opposite sides of the fixing seat, and the second sealing member provides resistance to an inner surface of the housing assembly.

19. The optical fiber adapter of claim 18, wherein the fixing seat further defines an annular groove in an outer surface of an end of the fixing seat adjacent to the base board for receiving the second sealing member.

20. The optical fiber adapter of claim 18, wherein the base board defines two through holes in opposite sides of the fixing seat, and each of the two latching arms extends from an inner side wall of one through hole away from the base board.

* * * * *